United States Patent
McElveen

(10) Patent No.: US 11,533,173 B2
(45) Date of Patent: Dec. 20, 2022

(54) SYSTEMS AND METHODS FOR COMPRESSION AND ENCRYPTION OF DATA

(71) Applicant: LOGNOVATIONS HOLDINGS, LLC, Tampa, FL (US)

(72) Inventor: Christopher A. McElveen, Tampa, FL (US)

(73) Assignee: Lognovations Holdings, LLC, Tampa, FL (US)

( * ) Notice: Subject to any disclaimer, the term of this patent is extended or adjusted under 35 U.S.C. 154(b) by 127 days.

(21) Appl. No.: 16/899,457

(22) Filed: Jun. 11, 2020

(65) Prior Publication Data
US 2021/0391990 A1    Dec. 16, 2021

(51) Int. Cl.
| | |
|---|---|
| *H04L 9/08* | (2006.01) |
| *H04L 9/06* | (2006.01) |
| *G06F 16/901* | (2019.01) |
| *H04L 9/14* | (2006.01) |

(52) U.S. Cl.
CPC ........ *H04L 9/0869* (2013.01); *G06F 16/9014* (2019.01); *G06F 16/9024* (2019.01); *H04L 9/0643* (2013.01); *H04L 9/0825* (2013.01); *H04L 9/14* (2013.01)

(58) Field of Classification Search
CPC ... H04L 9/0869; H04L 9/0643; H04L 9/0825; H04L 9/14; G06F 16/9014; G06F 16/9024; G06F 21/6209
USPC ......................................................... 713/171
See application file for complete search history.

(56) References Cited

U.S. PATENT DOCUMENTS

| | | | | |
|---|---|---|---|---|
| 5,778,102 A | * | 7/1998 | Sandford, II | H04N 19/61 |
| | | | | 375/E7.267 |
| 7,254,232 B2 | * | 8/2007 | DiSanto | H04L 9/16 |
| | | | | 380/37 |
| 10,339,112 B1 | * | 7/2019 | Ranade | G06F 11/1453 |
| 10,491,240 B1 | * | 11/2019 | Dupont | H03M 7/3088 |
| 2001/0042204 A1 | * | 11/2001 | Blaker | H04L 45/745 |
| | | | | 707/999.009 |
| 2004/0264698 A1 | * | 12/2004 | Oda | H04N 1/4486 |
| | | | | 380/217 |

(Continued)

OTHER PUBLICATIONS

Cryptographic key authentication method and certificate for chip card—JP 3980145 B2 (Machine Translation) Inventors: Deindl, Michael; Hänel, Walter; and Schaal, Albert pp. 9; Published on: Sep. 26, 2007.*

(Continued)

*Primary Examiner* — Brian F Shaw
*Assistant Examiner* — Ali H. Cheema
(74) *Attorney, Agent, or Firm* — Brian J. Colandreo; Heath M. Sargeant; Holland & Knight LLP

(57) ABSTRACT

A system and method for compression and encryption of data includes creating a plurality of hash table keys by applying a bit mask to an encryption key, applying a hashing function to the encryption key, creating a hash table using the hashing function, the hash table including the plurality of hash table keys and index values, the index values each identifying a location of data in the hash table connected to one of the plurality of hash table keys, receiving input data, and encoding the input data to generate encoded data, the encoding including both compression and encryption of the input data using the encryption key and the hash table.

17 Claims, 19 Drawing Sheets

(56) References Cited

U.S. PATENT DOCUMENTS

| | | | |
|---|---|---|---|
| 2006/0224892 A1* | 10/2006 | Brown | H04L 9/0844 |
| | | | 713/181 |
| 2011/0153861 A1 | 6/2011 | Chauhan | |
| 2012/0039469 A1 | 2/2012 | Mueller et al. | |
| 2012/0246485 A1* | 9/2012 | Norimoto | G06F 21/6209 |
| | | | 713/189 |
| 2014/0108362 A1* | 4/2014 | Kim | H03M 7/3084 |
| | | | 707/693 |
| 2014/0188893 A1* | 7/2014 | Kobayashi | G06F 16/9014 |
| | | | 707/747 |
| 2015/0006880 A1* | 1/2015 | Alculumbre | H04L 9/0825 |
| | | | 713/153 |
| 2015/0086013 A1* | 3/2015 | Metzler | H04N 21/2343 |
| | | | 380/210 |
| 2018/0131612 A1* | 5/2018 | Hakhumyan | H04L 45/7453 |
| 2018/0351920 A1* | 12/2018 | Yoo | H04L 9/3239 |
| 2020/0151356 A1* | 5/2020 | Rohloff | G06F 21/6227 |
| 2021/0144005 A1* | 5/2021 | Stanley | H04L 9/3242 |

OTHER PUBLICATIONS

International Search Report and Written Opinion issued in International Application No. PCT/US2021/035272 dated Aug. 31, 2021.

\* cited by examiner

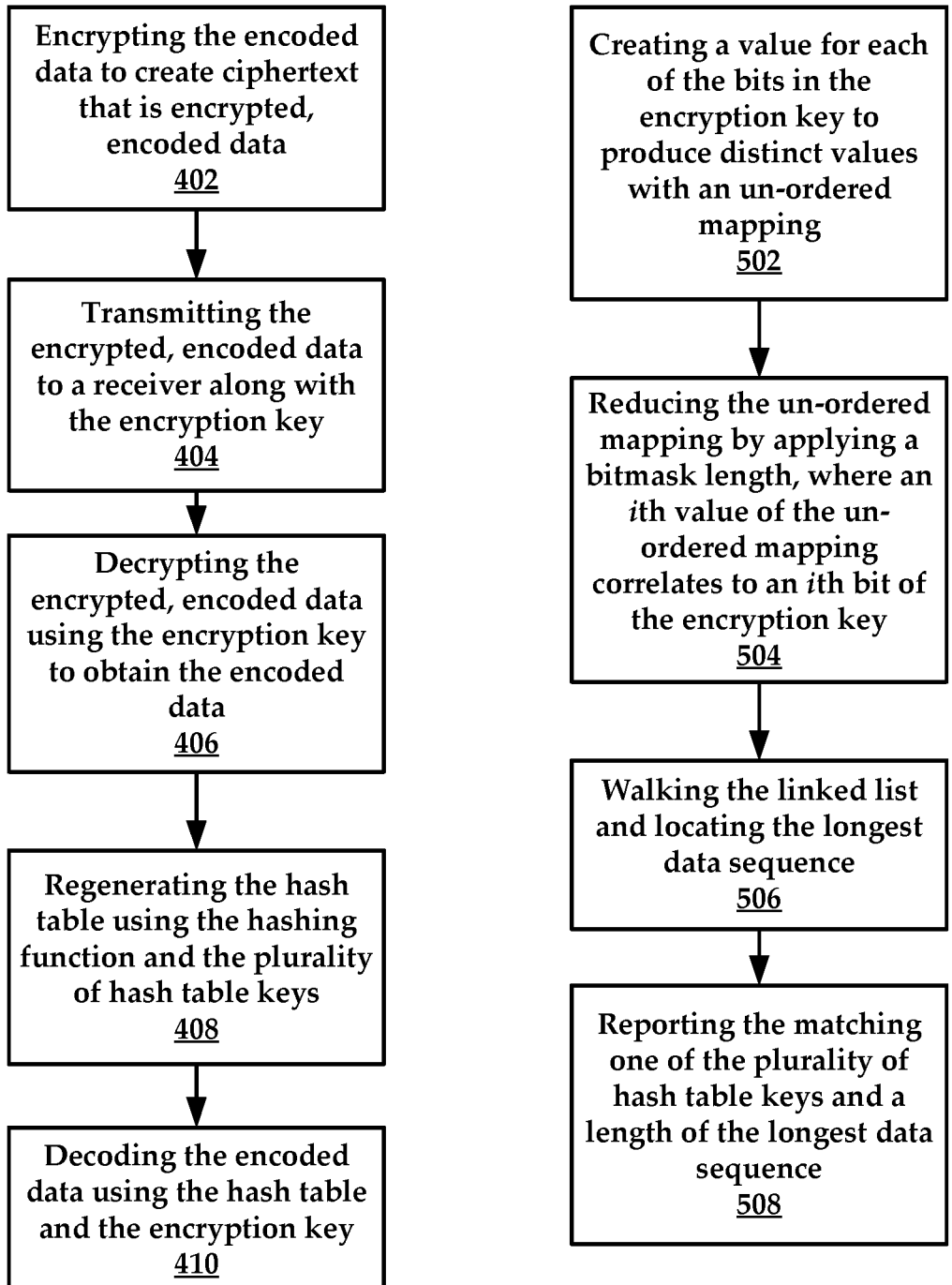

generate_key.

py

```python
import os import sys from squeeze.keys import BinPermutor, EntropyKeyGenerator
from squeeze.bitstring import get_random_bytes
from squeeze.squeeze_pb2 import KeyFile k = KeyFile()

depth = int(sys.argv[1])

if os.getenv('WITH_ENTROPY') == '1':

bitstring = ''.join(c for c in EntropyKeyGenerator(
        int(sys.argv[1]),
        float(sys.argv[2]),
        int(os.getenv('NUM_WORKERS', 1)),
    ))

if len(sys.argv) > 3:
        k.key_name = sys.argv[3]
    sys.stdout.buffer.write(k.SerializeToString())
elif os.getenv('PERMUTOR'):
    bitstring = ''.join(c for c in BinPermutor(depth))
    k.chunks.extend([int(bitstring[i:(i + 64)], 2)
                    for i in range(0, len(bitstring))])

k.bits = depth if len(sys.argv) > 2:
        k.key_name = sys.argv[2]
    sys.stdout.buffer.write(k.SerializeToString())
```

*FIG. 8*

```
    else:
        bits = int(sys.argv[1])
        bytenum = bits // 8
        print("generating a key %d-bit key (%d bytes)" % (bits,
        bytenum)) key = int.from_bytes(get_random_bytes(bytenum),
        sys.byteorder) print("transforming to int...")
        bit_key = "{0:b}".format(key)
        k.bits = bits
        print("chunking into 64-bit integers")

k.chunks.extend([int(bit_key[i:(i + 64)], 2) for i in range(0,
    bits, 64)])
        k.key_name = str(sys.argv[2])
        print("writing to %s" %
        k.key_name) with
        open(k.key_name, 'wb') as f1:
            f1.write(k.SerializeToString())
``` bitstring.py

```
  def get_random_bytes(byte_size):

if float(byte_size) >= 1e+8: bytestring = os.urandom(int(1e+8)) while
      len(bytestring) < byte_size:
          bytestring += os.urandom(int(1e+8)) return bytestring
else:
      return os.urandom(byte_size)
```

*FIG. 8 (Cont.)* keys.py

```python
from concurrent.futures import ProcessPoolExecutor from itertools import product from .squeeze_pb2 import KeyFile as KeyFileBuf import random class BinPermutor(): """
    Provides an iterator for all permutations of binary in a given depth
    """

def_init_(self, depth): """
        constructor method

:param depth: the number of bits

:type depth: int """
        self.depth = depth self.generator = product("01", repeat=depth)
        self.buffer = [] self.buffersize = 0 self.curr_bytes = '' def_len__(self):
```

*FIG. 8 (Cont.)*

```
        """
            Provides the length of this class based on the
knowledge of the depth
            :return: a number :rtype: int """
            return self.depth * (2 ** self.depth)

def _iter_(self): """
        iterator method

:return: self

:rtype: BinPermutor """
        return self def __next__(self):

if not self.curr_bytes:

# this will raise a StopIteration for
us
        self.curr_bytes = next(self.generator)

NOTE WE'RE CASTING TO STRING HERE ret, self.curr_bytes = self.curr_bytes[0],
self.curr_bytes[1:]

self.buffer.append(ret)

self.buffersize += 1 return ret def_getitem_(self, key):
```

*FIG. 8 (Cont.)*

```
"""
list access method

:param key: the index or slice

:type key: int|slice

:return: the character at that index

:rtype: str
"""
if type(key) == slice:
    stop = key.stop
    if not stop:
        stop = len(self)
    step = key.step
    if not key.step:
        step = 1
    return [self[x] for x in range(key.start, stop, step)]
else:
    while self.buffersize <= key:
        try:
            next(self)
        except StopIteration:
            raise IndexError("Out of bounds")
    return self.buffer[key]
 def __str__(self):
   return ''.join(self.buffer)

def new(self): """
```

*FIG. 8 (Cont.)*

```
        Generates a fresh one, since rewind isn't
supported
        :rtype: BinPermutor :return: a new BinPermutor """
        return BinPermutor(self.depth)

class Key(BinPermutor): """
    Lets us iterate over the ones and zeroes
represented from a given integer
    """

def _init_(self, depth, key_int): """
        Constructor for creating a key generator from an
integer
        :param depth: the number of bits :type depth: int :param key_int: the integer value of a key :type key_int: int """
        self.bitstring = "{0:b}".format(key_int)
        self.generator = iter(self.bitstring) self.buffer
        = []
        self.buffersize = 0
        self.curr_bytes = ''
        self.depth = depth
```

*FIG. 8 (Cont.)*

```
    def _len_(self): """
        Provides the length of this class based on the
knowledge of the depth
        :return: a number :rtype: int """
        return len(self.bitstring)

def new(self): """
        Generates a fresh one, since rewind isn't
supported
        :rtype: KeyFile :return: a new KeyFile """
        return Key(self.depth, self.key_int)

def chunk_bits(self, chunk): return
''.join(self[chunk.index:chunk.index +
chunk.bits])

class KeyFile(Key): """
    Lets us iterate over the ones and zeroes
represented in a key file
    Key files are stored as a hexadecimal integer
representing a sorted
    concatenation of the permutations of ones and zeroes
for a given depth
```

*FIG. 8 (Cont.)*

```
        according to a particular hash function """
        def_init_(self, key_filename): """
            :param key_filename: a filename where the key file is stored
            :type key_filename: str """
            with open(key_filename, 'rb') as fl: kf = KeyFileBuf()
                kf.ParseFromString(fl.read())
        self.bitstring =
        ''.join(["{0:b}".format(chunk, 2)

for chunk in
         kf.chunks])
        self.generator =
        iter(self.bitstring)
        self.buffer = []
        self.buffersiz
        e = 0
        self.curr_byte
        s = '' def_str__(self):
        return self.bitstring def
generate_bitstring_from_entropy(bit
s, entropy):
    """

Generates a string of ones and zeroes
using entropy as probability
    :param bits: the number of bits aka depth :type bits: int
```

*FIG. 8 (Cont.)*

```
    :param entropy: the entropy, a value between
zero and one
    :type entropy: float :return: the bitstring :rtype: str """
    return ''.join([ random.choices(['0', '1'], [1 - entropy,
entropy])[0]
        for _ in range(0, 2**bits)

])

class EntropyKeyGenerator(BinPermutor): """
    Helps us generate a key using entropy to
improve speed.

It's threaded, which improves speed. """

def_init_(self, depth, byte_split=16, max_workers=1,
entropy=0.5):
        """

constructor method

:param depth: the number of bits

:type depth: int """
        self.depth = depth self.entropy = entropy self.max_workers = max_workers
        self.byte_split = min([byte_split, depth])
```

*FIG. 8 (Cont.)*

```
        self.buffer = [] self.buffersize = 0 self.curr_bytes = '' self.max_bytes =

2self.depth self.byte_interval = 2self.byte_split if self.max_workers > 1:
            self.curr_future_offset = 0 self.executor =
    ProcessPoolExecutor(max_workers=max_workers)
            self.futures = []

pre-populate some futures self.populate_futures()

def populate_futures(self):

for i in range(self.curr_future_offset, self.max_bytes, self.byte_interval)[0:self.max_workers]:

self.futures.append(self.executor.submit(self.gen
    eration_function, self.byte_split, self.entropy))
            self.curr_future_offset = i @property def generator(self):
        if self.max_workers == 1: yield
    iter(generate_bitstring_from_entropy(self.max_byt es,
```

*FIG. 8 (Cont.)*

```
                self.entropy))
            else:

while (self.curr_future_offset <= self.max_bytes
                    or len(self.futures)): self.futures.append( self.executor.submit(self.generation_function, self.byte_split, self.entropy)
                        )
                self.curr_future_offset += self.byte_interval
                future, self.futures = self.futures[0],
    self.futures[1:]
                print("yielding futures (%.3f%%)"
    %

(float(self.curr_future_offset)
                        / float(self.max_bytes) *
            100))
                yield future.result()

@property
    def generation_function(self):
        return generate_bitstring_from_entropy def random_from_bytes(max_val): return random.randint(0,
    max_val)
```

*FIG. 8 (Cont.)*

```
class RandomIntKeyGenerator(EntropyKeyGenerator):

def _init_(self, depth, max_workers=1):
        """
        constructor method

:param depth: the number of bits

:type depth: int
        """
        self.depth = depth
        self.max_workers = max_workers
        self.buffer = []
        self.buffersize = 0
        self.curr_bytes = ''
        self.max_bytes = 2 ** self.depth
        self.byte_interval = 64
        self.max_byte_interval_int = 2 ** 64
        self.curr_future_offset = 0
        self.executor = ProcessPoolExecutor(max_workers=max_workers)
        self.futures = []
        # pre-populate some futures
        self.populate_futures(
        )

@property
    def generation_function(self):
        # we're going to return a random integer that we can then split into zeroes whenever return random_from_bytes
```

*FIG. 8 (Cont.)*

```
    def_len__(self):

return len(range(0, self.max_bytes,
self.byte_interval)

def_iter_(self): return self def_next__(self):

return next(self.generator)

def populate_futures(self):

for i in range(0, self.max_workers):
            self.futures.append(
self.executor.submit(self.generation_function, self.max_byte_interval_int))
            self.curr_future_offset =
self.byte_interval * self.max_workers @property def generator(self):

while self.curr_future_offset <=
self.max_bytes or len(self.futures):
            if self.curr_future_offset <=
self.max_bytes:
                self.futures.append( self.executor.submit(self.generation_function, self.byte_interval))

self.curr_future_offset +=
self.byte_interval
            future, self.futures =
self.futures[0], self.futures[1:]
            print("yielding futures (%.3f%%)" % ( float(self.curr_future_offset) /
float(self.max_bytes) * 100))
            yield future.result()
```

*FIG. 8 (Cont.)*

SYSTEMS AND METHODS FOR COMPRESSION AND ENCRYPTION OF DATA

CROSS-REFERENCE TO RELATED APPLICATIONS

N/A

FIELD OF THE PRESENT TECHNOLOGY

The present disclosure pertains to the technical field of data security and privacy, and more specifically, but not by way of limitation, to systems and methods that encode data using a single process of compression and encryption.

SUMMARY

The present disclosure can include a method comprising creating a plurality of hash table keys by applying a bit mask to an encryption key; applying a hashing function to the encryption key; creating a hash table using the hashing function, the hash table comprising the plurality of hash table keys and index values, the index values each identifying a location of data in the hash table connected to one of the plurality of hash table keys; receiving input data; and encoding the input data to generate encoded data, the encoding including both compression and encryption of the input data using the encryption key and the hash table.

The present disclosure can include a system comprising: a processor; and a memory for storing instructions, the processor executing the instructions to create a plurality of hash table keys by applying a bit mask to an encryption key; apply a hashing function to the encryption key; create a hash table using the hashing function, the hash table comprising the plurality of hash table keys and index values, the index values each identifying a location of data in the hash table connected to one of the plurality of hash table keys; receive input data; and encode the input data to generate encoded data, the encoding including both compression and encryption of the input data using the encryption key and the hash table.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 4 is a flowchart of another example sub-method of the present disclosure.

FIG. 5 is a flowchart of yet another example sub-method of the present disclosure, related to hash table creation.

FIG. 8 illustrates example code for implementing an encryption key process of the present disclosure.

DETAILED DESCRIPTION

Overview

Generally, the present disclosure pertains to data security and privacy. In more detail, the systems and methods herein can be used to compress and encrypt an input data file or stream in a singular process referred to generally as encoding.

For context, the fundamental properties and goals of data compression and encryption are different from one another. A goal of data compression is to exploit patterns in data to reduce redundancy and thus make the output smaller than the original, while a goal of data encryption is to encode data such that patterns cannot be found and thus protect the information contained within the input data or stream.

There are clear benefits for data compression to reduce the size of data in transit and at rest via reduced costs of storage and or transmission. There are also clear benefits for data encryption to protect a data file or streams contents from being known. Combining data compression and encryption has wide applicability as more data is being generated year-over-year and more end users are concerned about privacy and the security of their information. Every year the gross amount of data being created, transmitted, and stored is increasing. Given the rise and cost effectiveness of cloud computing and personal computing devices, end users are increasingly reliant upon the computing resources of a few large centralized points. Securing an end user's data, such as a file or stream, when in transit to a central processing facility, while the data are being stored, or even waiting to be processed has become a key differentiating factor for entities both in the public and the private realms. The costs of transmitting and storing data remain relatively fixed. Thus a reduction in the gross amount of data being transmitted or stored can reduce the cost to operate a business, which counts data transmission or storage as a cost.

Combining data compression and encryption as disclosed herein provides all of the individual benefits of both data compression and encryption in a singular process. A singular process reduces the need for multiple steps of compression and encryption. The reduction in the number of steps decreases the points of failure in a system, which can reduce the cost to maintain or operate such a system and increase the availability of that system to end users.

Example Embodiments

Figure 1:
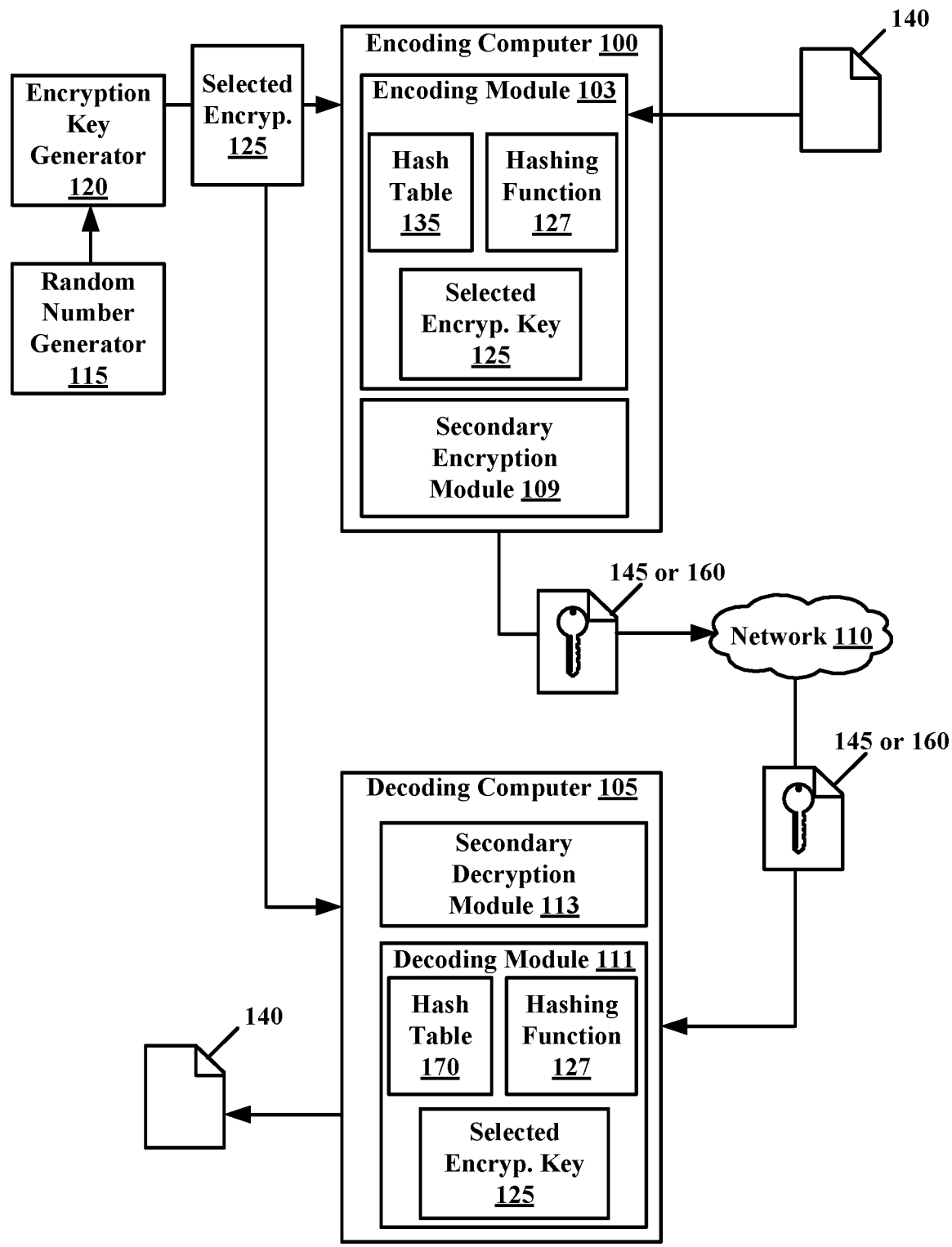
FIG. 1 depicts an illustrative schematic in which techniques and structures for providing the systems and methods disclosed herein may be implemented.

Turning now to the drawings, FIG. 1 depicts an illustrative schematic in which techniques and structures for providing the systems and methods disclosed herein may be implemented related to data encoding. As noted above, encoding includes both compression and encryption of data in a single end-to-end process.

A system can be used to encode data (a combination of compression and encryption) using a private key generated using a random number generator. The private key functions as an encryption key and is used to generate hash table keys, and a hash function. The system can comprise an encoding computer 100 and a decoding computer 105 that are communicatively coupled together over a network 110. The system 100 also includes a random number generator 115 and an encryption key generator 120. The encoding computer 100 can comprise an encoding module 103 and a secondary encryption module 109. The decoding computer 105 can comprise a decoding module 111 and a secondary decryption module 113.

The network 110 may include any one or a combination of multiple different types of networks, such as cable networks, the Internet, wireless networks, and other private and/or public networks. In some instances, the network 110 may include cellular, Wi-Fi, or Wi-Fi direct. Any short or long range wireless or wired communications can be used.

While distinct computing systems are illustrated, the encoding computer 100 and decoding computer 105 could be integrated into the same device or system, allowing for secure data transmission in a single system or device. The encoding computer 100 and decoding computer 105 could function as modules in the same device.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

The random number generator 115 is configured to generate bits of entropy used to seed key generation by the encryption key generator 120. The encryption key generator 120 receives the entropy bits from the random number generator 115 and generates a plurality of encryption keys. The number of encryption keys generated can vary according to design requirements. In some embodiments, each key is a 128 bit key, but keys of other sizes can also be generated. To be sure, each of the plurality of encryption keys can have a similar length to one another.

The plurality of encryption keys are generated to create a pool of candidate encryption keys that can be used to encode data as disclosed herein. In some embodiments, an optimal encryption key is selected from the plurality of encryption keys. In some embodiments, a quantity of the plurality of encryption keys can be sufficiently large to allow for iterative encryption key analysis.

The encryption key that is ultimately selected can include one of the candidate encryption keys that yields both a desired amount of compression and desired amount of encryption (e.g., encoding). Selected key discovery can include an iterative process of encoding and decoding a plurality of sample data files with each of the plurality of encryption keys to determine which encryption keys can be used and which cannot be used. The comparison can include evaluating the amount of compression of the sample data files that result from using the plurality of encryption keys.

It will be understood that the optimal encryption key or set of encryption keys that are selected for encoding data according to the present disclosure may not be the most optimal encryption key of the plurality of encryption keys, as such a key would be easy to find and check against the transmitted or stored data file or stream.

It will be understood that given a randomly generated encryption key of n bits there exist $(2^n)-1$ different encryption keys which represent $((2An)*n)-1$ different optimal start positions for a bitwise indexing function (the use of the bitwise indexing function is described infra). Stated otherwise, for every n bit window size there exists an optimal encryption key for compression. If n is sufficiently large and if $(2^n)-1$'s order is not known outside of an encoding and/or decoding function, then there exists an encryption key which will yield compression and encryption for every n.

Further, if n is truly random and the encryption key of $2^n-1$ is truly random no compression will occur. The output of f(i) (i.e. the encoding and/or decoding function) given the encryption key is perfectly encrypted if and only if the contents of n and its encryption key $(2^n)-1$ are not known.

For every optimal encryption key there exists a second most optimal, third most optimal, fourth most optimal and so on, until no compression occurs. Also, there exist many suboptimal encryption keys (i.e. makes n larger). In fact there are $|((2^n)-1)/(n))-(2^n)-1)|$ suboptimal encryption keys. A sufficiently large encryption key for use in encryption may not be determined by the gross number of bits of the encryption key, rather it can be determined by $(2^n)-1)/(n)$.

Ideally $(2^n)-1)/(n)$ should be larger than the number of encryption keys that can be readily stored or checked in a realistic or feasible amount of time or amount of money by an adversary. In some instances, an encryption key size should be greater than $(2^n)-1)$, and $(2^n)-1)/(n)$ is a sub group of $(2^n)-1$. All properties of the encryption key of $(2^n)-1$ and its sub-group $((2^n)-1)/(n))$ are the same with regards to computation.

It will be understood that the encryption key or set of encryption keys that are selected for use in generating a hash table 135 can be selected by comparing how the encryption key(s) both compress and encrypt sample files/data. That is, aspects of compression and encryption may vary based on the contents of the encryption key. For example, one encryption key may sufficiently compress a sample file, but fail to sufficiently encrypt the sample file. Another encryption key may insufficiently compress a sample file, but sufficiently encrypt the sample file. In some embodiments, the encoding computer 100 can be configured to select the encryption key from the plurality of encryption keys that has a pre-selected balance of compression and encryption. In one embodiment, the compression can be a ratio of approximately 8:1.

In various embodiments, an encryption key that is selected for best compression may utilize standard keys representing all binary permutations of n-length. The series of binary information may not exceed a particular or selected length. Another encryption key can yield a combination that is an n-th most optimal encryption key. Another encryption key can be selected that is neither the most optimal for compression nor the most optimal for encryption, but a balance between encryption and compression.

In one embodiment, the selected encryption key 125 may be substantial in size so that a large variety of byte-sequences are present. Ideally, the selected encryption key 125 should permit the representation of 48-64 characters in terms of 1224 bits, yielding a 50%+compression rate, without the addition of variable length byte encoding (i.e. parameter "-c 0" referenced in FIG. 8), as well as providing data obfuscation. In one embodiment, a mask length of a bitmask utilized should be at least eight characters in length. The size of the mask length can vary according to operational requirements, as the content of the selected encryption key 125 may determine how broadly spread the data is when the selected encryption key 125 is applied. In sum, using the methods above, a single encryption key is selected from the plurality of encryption keys designated as a selected encryption key 125.

The single encryption key can be used to generate a plurality of hash table keys based on applying a bitmask to the single encryption key. The method also includes the step of generating a hash function 127 from the selected encryption key 125. The method includes a step of generating a hash table 135 from the hash function 127 and the plurality of hash keys.

Thus, of the various keys discussed herein, one key, referred to as the encryption key refers to the encoder/encryption key used to encode data. The encryption key can be in the form of a Key file, in some embodiments. Hash keys refer to key values of a generated hash table/map.

By way of example, a mechanism of key extraction can be explained using the following terms:

01←a byte of data;

01 23 45 67←one 32-bit size 'chunk' from a key file for a document (e.g., sample file);

01 23 45 67 89 AB CD EF a 64-bit chunk read from the key file (referred to as a word) [01 23 45 67 89 AB CD EF, FE DC BA 98 76 54 32 10]←a basic, example encryption key;

[00000001 00100011 01000101 01100111 10001001 10101011 11001101 11101111

11111110 11011100 10111010 10011000 01110110 01010100 00110010 00010000]←our very basic encryption Key in binary (written in standard MSbit-first form)

The hash table is generated with one value for each of the bits in the key so in this example we'd have 128 distinct values in the unordered map. The ith value in the map relates to the ith bit in the total key. The hash table 135 can reference <i,j> components, where "i" is the index or start position of the match and the "j" is the length in bits of the match. Generally, with respect to <i,j>, i is the bit index and j is the match length in bits. Note: <i,j> can also be thought of as; <i mod j>.

In some embodiments, a hash function 127 is used to generate an index value identifying the location of data in the hash table 135 connected to a particular hash key.

These data are then reduced by a length of the bitmask that was passed. For example, a bitmask of four when passed to the codec construction would mean that every entry in the hash table would be four bits long. By way of example:

i=0: word 1;

i=31: Last half of word 1+the front half of word 2;

i=95: Last half of word 2+the front half of word 1; and i=127: the last bit of word 2+the front 63 bits of word 1.

By way of example, considering the 31st item to be added to the hash table 135 with a bitmask of 12, the following value is generated: [10001001 10101011 11001101 11101111 11111110 11011100 10111010 10011000] and added to the hash table with the following hash table key 10001001 1011. Conceptually, the entries of the hash table 135 functions as linked lists, so that all candidate segments of an input data that produce the same key are appended to the list at each entry.

Example

Figure 9:
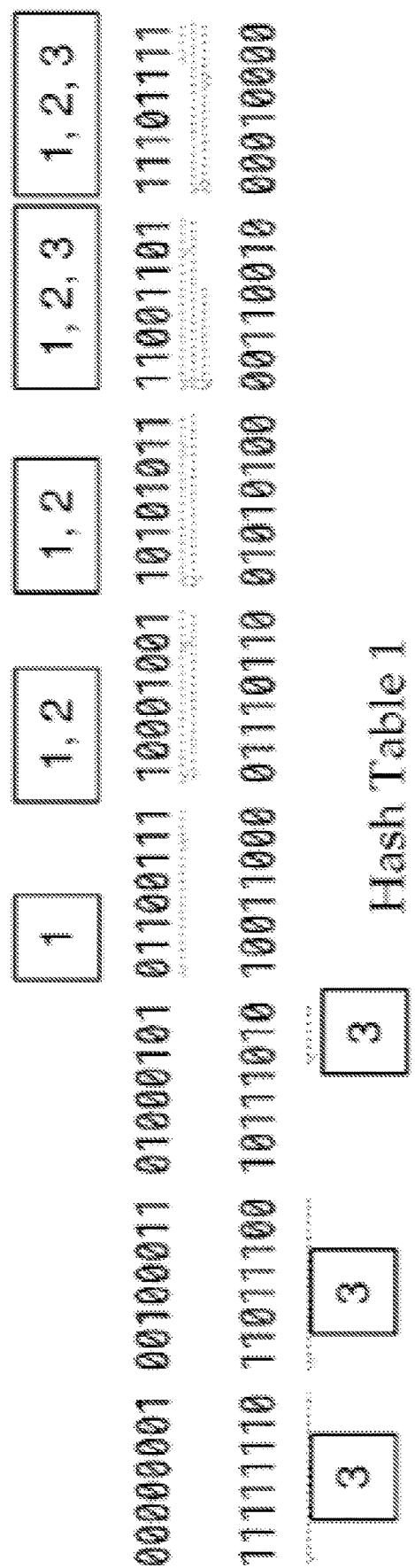
FIG. 9 illustrates an example hash table entry according to one embodiment of the present disclosure.

Given the Key from above and a mask length of 4, one entry of the hash table is shown in FIG. 9 with:
Hash key: 1001
Value: (linked list)
   1. 01011001 11100010 01101010 11110011
   2. 10001001 10101011 11001101 11101111
   3. 11111001 11011101 10011111 01011011

The elements of the Hash Table 1 are matched to the values above. That is, reference numbers above the hash table entries match the 1-3 values above. The lines extending above (or below) the reference numbers are arranged in order. For example, the value of 1100101 corresponds to values (1), (2), and partially to (3).

The hash table can be used to provide potential 0(1) matches to new strings in the encoding process. Once matching on the hash key, the encoder then walks the list and finds the word with the longest concordance from the right, and then reports the hash key and the length. This is an optimization for speed and can be used to reduce the number of comparisons.

Once the hash table has been generated, a process of encoding by the encoding computer 100 can occur. As noted above, encoding includes both compression and encryption in a single step. Broadly, the compression and encoding is facilitated using the hash table 135 that was generated as disclosed above. The encoding computer 100 can receive an input data 140 (file or data stream) and search for a longest data sequence in the received file that matches a key in the hash table 135, and retrieving the corresponding index value.

The encoding computer 100 uses index value(s) from the hash table 135 to encode the input data 140 into a compressed and encrypted representation, referred to generally as "encoded data 145". To be sure, the encoded data 145 has a shortened length of data, thereby compressing the input data 140. The substitution of index value(s) also functions to encrypt the input data 140. Thus, the encoded data 145 includes only references to the hash table and hash table keys.

In some embodiments, the encoding computer 100 can apply a secondary encryption type to further encrypt the encoded data 145. For example, the encoding computer 100 can utilize AES (advanced encryption standard), HE (homomorphic encryption), or other encryption type. This produces encrypted, encoded data 160. Again, the secondary encryption referenced here is different from the encryption that occurs in the combined process of compression/encryption that was used to encode the input data. The secondary encryption type can utilize a secondary encryption key.

The encoding computer 100 can transmit the encrypted, encoded data 160 on the computer network 110 to the decoding computer 105. Transmission of the encrypted binary data may be treated as other encrypted data files, as the data include sets of 'normal' numbers.

Careful control of key distribution can be used as the methods herein utilize a symmetric method of encryption. Users may keep data files and the encryption keys stored apart from one another and transmit each over distinct encrypted or isolated transmission methods. That is, when data such as encryption keys and hashing functions are shared between the encoding computer and the decoding computer, these data can be transmitted separately from the encoded data 145 (or encrypted, encoded data 160).

The decoding computer 105 receives the selected encryption key 125, the encrypted, encoded data 160, the secondary encryption key (if secondary encryption was used), and the hash function 127. If secondary encoding was used, the decoding computer 105 can decrypt the encrypted, encoded data 160 to recover the encoded data 145. The decoding computer 105 can then decode the encoded data 145 using the selected encryption key 125 by regenerating the hash table 170 (regenerated copy of the hash table 135) generated using the same plurality of hash keys and same hash function 127 as the hash table 135 disclosed above.

In one example, an incoming stream of content from a source file is chopped into 64-bit long values. The signature of the word is the mask length of least-significant bits (i.e. LSbyte if mask length is 8) and then that signature is searched for in the hash table. If there is a match, then the linked list in the table is walked, and the best initial match is found. If the value is not found, then the encoder performs a linear walk of the whole key with a sliding window to find the entry with the longest link.

The output is a sequence of ordered pairs: a bit position within the Key file and the length of the matching sequence of bits. Some 64-bit words will be split up if the Key is too short, reversing the compression feature of the algorithm. It will be understood that the encoding algorithm matches from LS→MS. It is standard to represent values the way done here with the MSbit on the left and the LSbit on the right. However, the bit index is counted starting from the LSbit of each successive byte.

TABLE 1

| | MS bit | | | | | | | LS bit | MS bit | | | | | | | LS bit |
|---|---|---|---|---|---|---|---|---|---|---|---|---|---|---|---|---|
| Key | 1 | 0 | 1 | 1 | 0 | 1 | 1 | 1 | 0 | 1 | 1 | 1 | 0 | 1 | 0 | 0 |
| bit idx | 7 | 6 | 5 | 4 | 3 | 2 | 1 | 0 | 15 | 14 | 13 | 12 | 11 | 10 | 9 | 8 |

A use case example references Table 1. Using an encryption key: [00000001 01100100 01101111 00111 011, 10001 011 10101011 11001101 111011111, 'dog' [01100100, 01101111, 01100111 1 could be encoded with <8,16>, <27,8> because the 8-24th Key bits cover the first two characters in the string, and the last character is conveyed in the 2735th Key bits.

When the encoded data is presented, the process of assembling the original message includes: for each pair in <i,j> go to the ith bit in the encryption key file and read j bits. This information is then staged into a continual stream of 64-bit words, and then those words are written out.

So the message <8,16>,<27,8> would require the decoder to copy 16 bits starting from the 8th position in the encryption key, and 8 bits starting from the 27th position in the Key, leading to 01100100, 01101111, 01100111 . . . or 'dog'.

Figure 2:
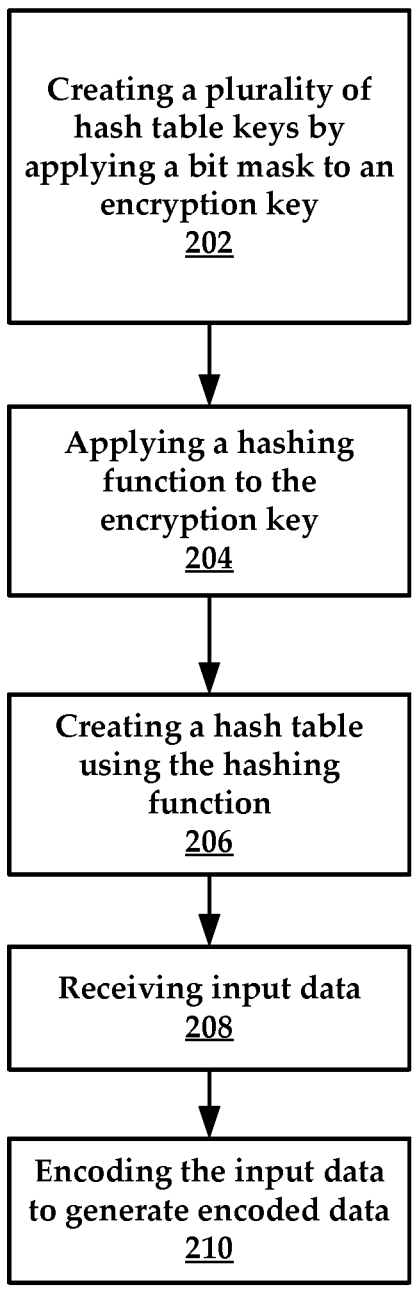
FIG. 2 is a flowchart of an example method of the present disclosure related to encoding data using a system as illustrated in FIG. 1.

FIG. 2 illustrates an example method of the present disclosure. The method can include a step 202 of creating a plurality of hash table keys by applying a bit mask to an encryption key. For context a mask length of a bit mask is a bit-width of the hash table keys disclosed above, and correspondingly, that of an input data's search value. The encryption key includes a specific, selected encryption key obtained from a plurality of possible or candidate encryption keys generated using a random number generator. In some instances, the method can also include the step of generating the plurality of encryption keys using a random process, and selecting the encryption key from the plurality of encryption keys based on an ability of the encryption key to both compress and encrypt input data.

The method can also include a step 204 of applying a hashing function to the encryption key, as well as a step 206 of creating a hash table using the hashing function. It will be understood that the hash table includes the plurality of hash table keys and index values. To be sure, the index values each identifying a location of data in the hash table connected to one of the plurality of hash table keys.

Once the hash table is created, method can include a step 208 of receiving input data, and a step 210 of encoding the input data to generate encoded data. As noted above, the encoding includes both compression and encryption of the input data using the encryption key and the hash table.

Figure 3:
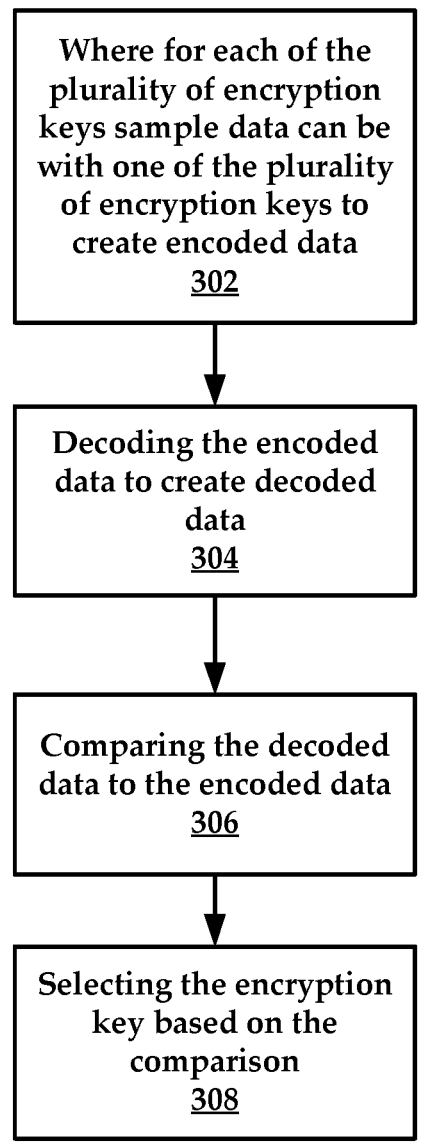
FIG. 3 is a flowchart of an example sub-method of the present disclosure.

FIG. 3 is a method for choosing the selected encryption key. The method can include a step 302 where for each of the plurality of encryption keys sample data can be with one of the plurality of encryption keys to create encoded data. The method further includes a step 304 of decoding the encoded data to create decoded data. Next, the method can include a step 306 of comparing the decoded data to the encoded data and a step 308 of selecting the encryption key based on the comparison.

FIG. 4 is another example method of the present disclosure that includes a step 402 of encrypting the encoded data to create ciphertext that is encrypted, encoded data. As noted above this encryption can include using AES, HE, or other desired encryption method. The method can also include a step 404 of transmitting the encrypted, encoded data to a receiver along with the encryption key.

The method can include a step 406 of decrypting the encrypted, encoded data using the encryption key to obtain the encoded data, as well as a step 408 of regenerating the hash table using the hashing function and the plurality of hash table keys. In some instances, the method comprises a step 410 of decoding the encoded data using the hash table and the encryption key.

FIG. 5 is yet another example method of the present disclosure related to hash table creation. The method can include a step 502 of creating a value for each of the bits in the encryption key to produce distinct values with an unordered mapping. The method can also include a step 504 of reducing the unordered mapping by applying a bitmask length. To be sure, an ith value of the unordered mapping correlates to an ith bit of the encryption key. The hash table comprises a linked list in some embodiments.

The method can also include steps related to searching for the longest data sequence in the input data that matches one of the plurality of hash table keys. Thus, the method can include a step 506 of walking the linked list and locating the longest data sequence, as well as a step 508 of reporting the matching one of the plurality of hash table keys and a length of the longest data sequence.

Figure 6:
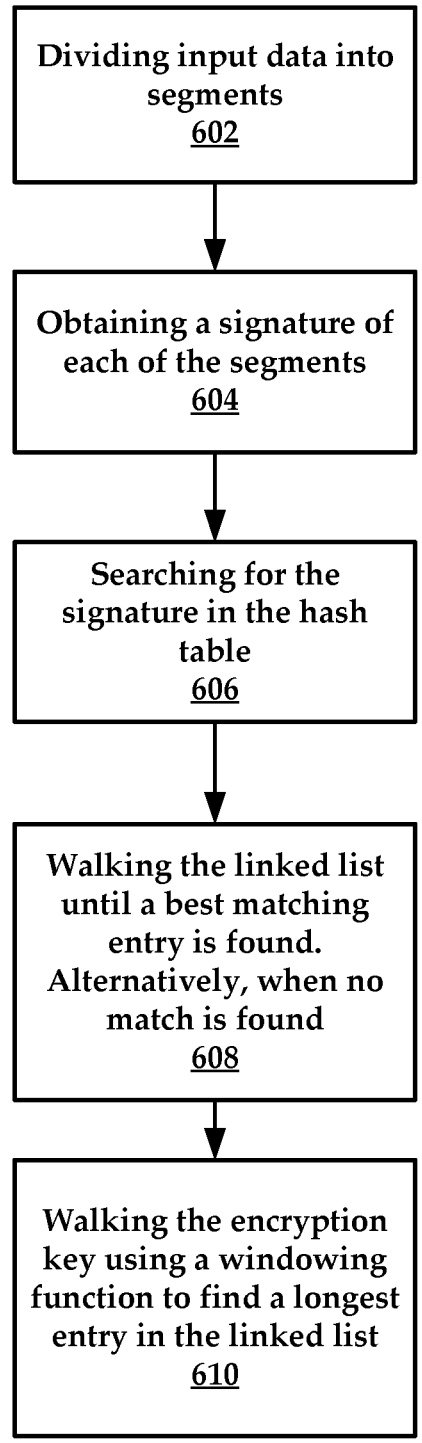
FIG. 6 is a flowchart of yet another example sub-method of the present disclosure, related to encoding of input data.

FIG. 6 is another example method illustrated as a flowchart, related to encoding of input data. The method can include a step 602 of dividing input data into segments. The method can include a step 604 of obtaining a signature of each of the segments. This can include hashing each segment using any desired hashing method.

The method can include a step 606 of searching for the signature in the hash table. When a match is found for the signature, the method can include a step 608 walking the linked list until a best matching entry is found. Alternatively, when no match is found, the method can include a step 610 of walking the encryption key using a windowing function to find a longest entry in the linked list.

Again, the process of encoding produces a sequence of ordered pairs that comprises a bit position within the encrypted key and a length of the matching entry. The sequence of ordered pairs is a compressed and encrypted version of the input data. In some instances, the bitmask length used in this process is eight bit, allowing for 8:1 compression of the input data.

Figure 7:
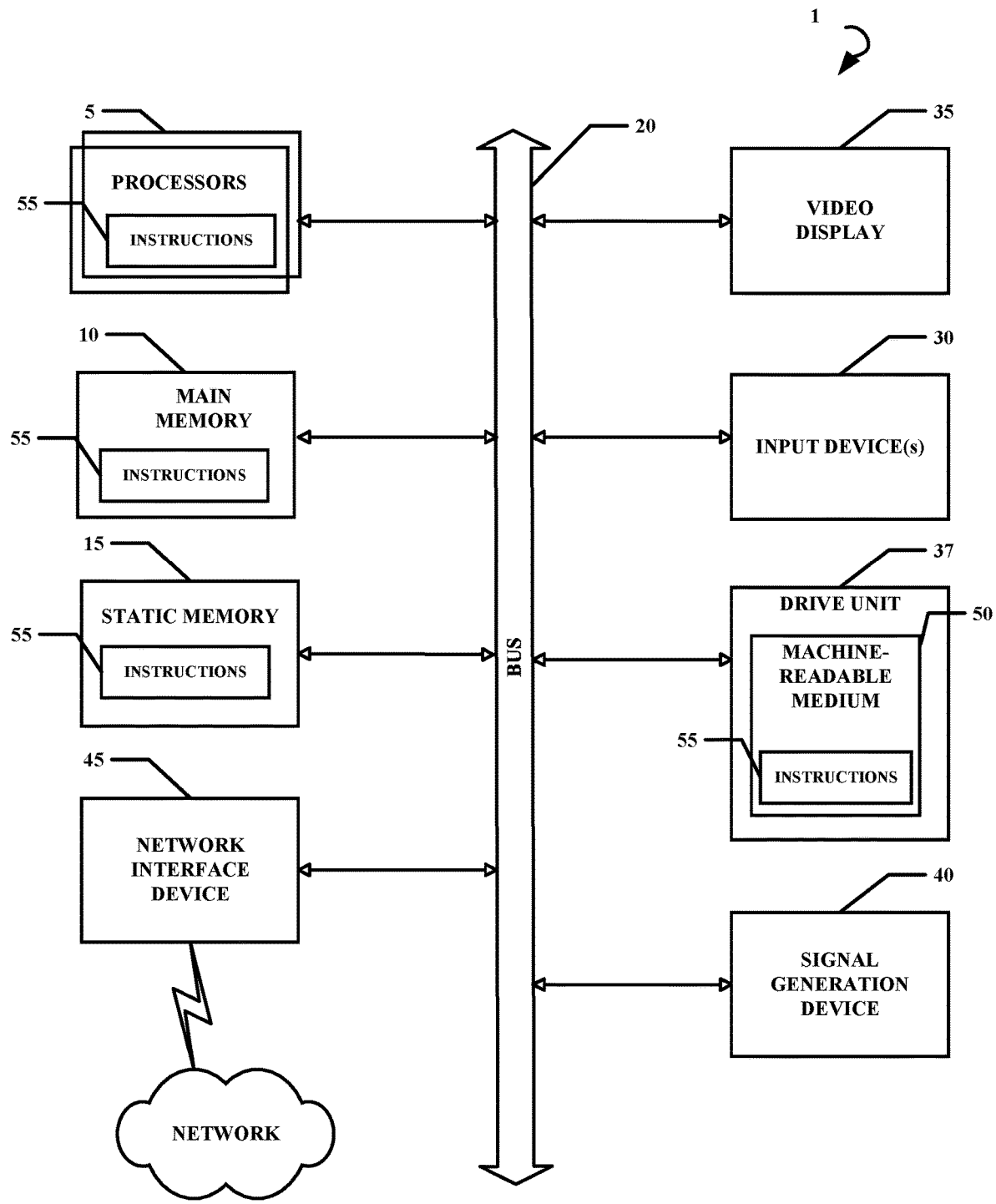
FIG. 7 is a schematic diagram of an exemplary computer system that is used to implement embodiments according to the present technology.

FIG. 7 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 are those typically found in computer systems that may be suitable for use with embodiments of the present disclosure and are intended to represent a broad category of such computer components that are well known in the art. Thus, the computer system 1 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer device 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:
1. A method, comprising:
creating a plurality of hash table keys by applying a bit mask to an encryption key;
applying a hashing function to the encryption key;
creating a hash table using the hashing function, the hash table comprising the plurality of hash table keys and index values, the index values each identifying a location of data in the hash table connected to one of the plurality of hash table keys, wherein creating the hash table includes:
creating a value for each of the bits in the encryption key to produce distinct values with an un-ordered mapping; and
reducing the un-ordered mapping by applying a bit-mask length, where an ith value of the un-ordered mapping correlates to an ith bit of the encryption key, wherein the hash table comprises a linked list;
receiving input data; and
encoding the input data to generate encoded data, the encoding comprising both compression and encryption of the input data using the encryption key and the hash table, wherein encoding the input data to generate encoded data comprises:
initially searching for a longest data sequence in the input data that matches one of the plurality of hash table keys;

retrieving a corresponding one of the index values matching the longest data sequence from the plurality of hash table keys; and retrieving additional ones of the index values to encode a remainder of the input data.

2. The method according to claim 1, further comprising:
generating a plurality of encryption keys using a random process; and
selecting the encryption key from the plurality of encryption keys based on an ability of the encryption key to both compress and encrypt the input data.

3. The method according to claim 2 further comprising:
for each of the plurality of encryption keys, encoding sample data with one of the plurality of encryption keys to create encoded data;
decoding the encoded data to create decoded data;
comparing the decoded data to the encoded data; and
selecting the encryption key based on the comparison.

4. The method according to claim 1, further comprising encrypting the encoded data to create ciphertext that is encrypted, encoded data.

5. The method according to claim 1, further comprising transmitting the encrypted, encoded data to a receiver along with the encryption key.

6. The method according to claim 5, further comprising:
decrypting the encrypted, encoded data using the encryption key to obtain the encoded data;
regenerating the hash table using the hashing function and the plurality of hash table keys; and
decoding the encoded data using the hash table and the encryption key.

7. The method according to claim 1, wherein searching for the longest data sequence in the input data that matches one of the plurality of hash table keys comprises:
further comprising walking the linked list and locating the longest data sequence; and
reporting the matching one of the plurality of hash table keys and a length of the longest data sequence.

8. The method according to claim 1, wherein encoding comprises:
dividing input data into segments;
obtaining a signature of each of the segments;
searching for the signature in the hash table;
when a match is found for the signature, walking a linked list until a best matching entry is found; and
wherein when no match is found, walking the encryption key using a windowing function to find a longest entry in the linked list.

9. The method according to claim 8, wherein encoding produces a sequence of ordered pairs that comprises a bit position within the encrypted key and a length of the matching entry.

10. The method according to claim 9, wherein the sequence of ordered pairs is a compressed and encrypted version of the input data.

11. The method according to claim 9, wherein the bitmask length is eight bit, allowing for 8:1 compression of the input data.

12. A system, comprising:
a processor; and
a memory for storing instructions, the processor executing the instructions to:
create a plurality of hash table keys by applying a bit mask to an encryption key;
apply a hashing function to the encryption key;
create a hash table using the hashing function, the hash table comprising the plurality of hash table keys and index values, the index values each identifying a location of data in the hash table connected to one of the plurality of hash table keys, wherein creating the table comprises:
creating a value for each of the bits in the encryption key to produce distinct values with an un-ordered mapping; and
reducing the un-ordered mapping by applying a bit mask length, where an ith value of the un-ordered mapping correlates to an ith bit of the encryption key, wherein the hash table comprises a linked list;
receive input data; and
encode the input data to generate encoded data, the encoding comprising both compression and encryption of the input data using the encryption key and the hash table, wherein encoding the input data to generate the encoded data comprises:
initially searching for a longest data sequence in the input data that matches one of the plurality of hash table keys;
retrieving a corresponding one of the index values matching the longest data sequence from the plurality of hash table keys; and
retrieving additional ones of the index values to encode a remainder of the input data.

13. The system according to claim 12, wherein the processor is configured to:
generate a plurality of encryption keys using a random process; and
select the encryption key from the plurality of encryption keys based on an ability of the encryption key to both compress and encrypt the input data.

14. The system according to claim 12, wherein the processor selects the encryption key to:
for each of the plurality of encryption keys, encode sample data with one of the plurality of encryption keys to create encoded data;
decode the encoded data to create decoded data;
compare the decoded data to the encoded data; and
select the encryption key based on the comparison.

15. The system according to claim 12, wherein the processor is configured to:
encrypt the encoded data to create ciphertext;
transmit the ciphertext to a receiver along with the encryption key;
decrypt the ciphertext using the encryption key to recover the encoded data;
regenerate the hash table using the hashing function and the plurality of hash table keys; and
decompress the encoded data using the hash table.

16. The system according to claim 12, wherein the search for the longest data sequence in the input data that matches one of the plurality of hash table keys comprises:
walking the linked list and locating the longest data sequence; and
reporting the matching one of the plurality of hash table keys and a length of the longest data sequence.

17. The system according to claim 16, wherein the processor is configured to:
divide input data into segments;
obtain a signature of each of the segments;
search for the signature in the hash table;
when a match is found for the signature, walk the linked list until a best matching entry is found; and wherein when no match is found, walking the encryption key using a windowing function to find a longest entry in the linked list.

\* \* \* \* \*